United States Patent [19]

Wilkes

[11] 4,247,127
[45] Jan. 27, 1981

[54] VEHICULAR SUSPENSION SYSTEM

[75] Inventor: Donald F. Wilkes, Albuquerque, N. Mex.

[73] Assignee: Atlantic Richfield Company, Los Angeles, Calif.

[21] Appl. No.: 953,843

[22] Filed: Oct. 23, 1978

[51] Int. Cl.³ .............................................. B62D 57/00
[52] U.S. Cl. ..................................... 280/28.5; 180/7 R; 280/29; 280/242 WC; 301/5 R; 301/41 R
[58] Field of Search .................. 180/7 R, 8 R, 8 F, 9, 180/209, 291, 313; 280/200, 28.5, 29, 229, 218, 219, 242 WC, 42, 208, 209; 46/220; 16/35 R, 18 R, 18 A; 305/60; 301/5 R, 41 R, 63 R

[56] References Cited

U.S. PATENT DOCUMENTS

| 396,854 | 1/1889 | Bowen | 280/208 |
|---|---|---|---|
| 2,998,996 | 9/1961 | Aghnides | 180/7 R |
| 3,001,601 | 7/1961 | Aghnides | 180/7 R |
| 3,212,594 | 10/1965 | Scott | 180/7 R |
| 3,666,292 | 5/1972 | Bartos | 280/42 |
| 3,695,375 | 10/1972 | Splawinski | 280/208 |
| 3,964,786 | 6/1976 | Mashuda | 297/330 |

Primary Examiner—John J. Love
Assistant Examiner—Donn McGiehan
Attorney, Agent, or Firm—Burns, Doane, Swecker & Mathis

[57] ABSTRACT

A wheelchair and rolling suspension system are supported by a pair of inclined, nested circular hoops. The hoops may be manually driven by lever arms accessable to the chair occupant. Moreover, the drive system permits the chair to negotiate straight lines, gradual and sharp curves, as well as to rotate about a vertical axis. The wheelchair is a two-wheel system having self-righting characteristics and is collapsible for storage and transportation. A seat assembly is articulatable between a vertically upright position and a fully reclined position. In addition, the wheelchair can function as a rocking chair.

26 Claims, 17 Drawing Figures

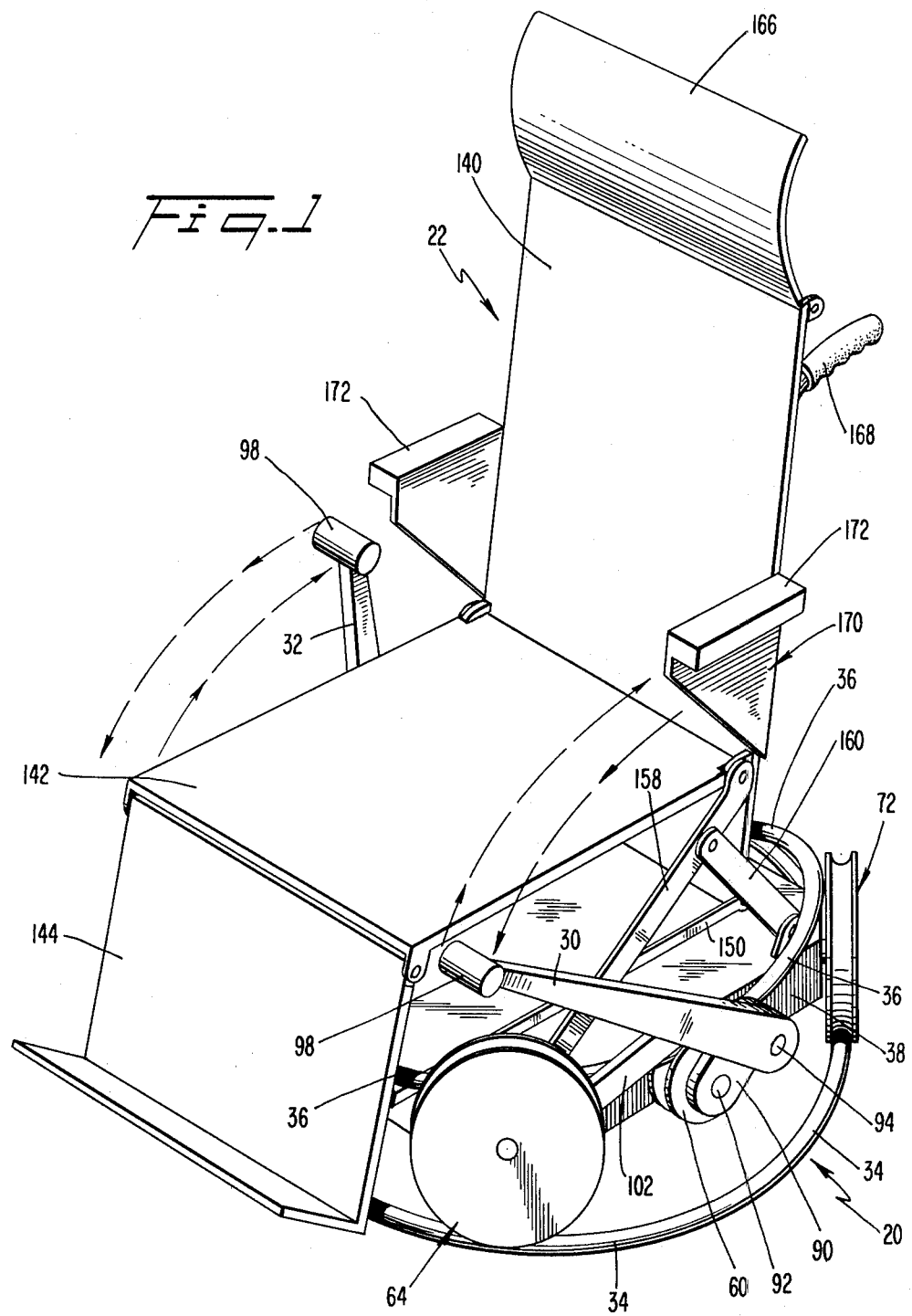

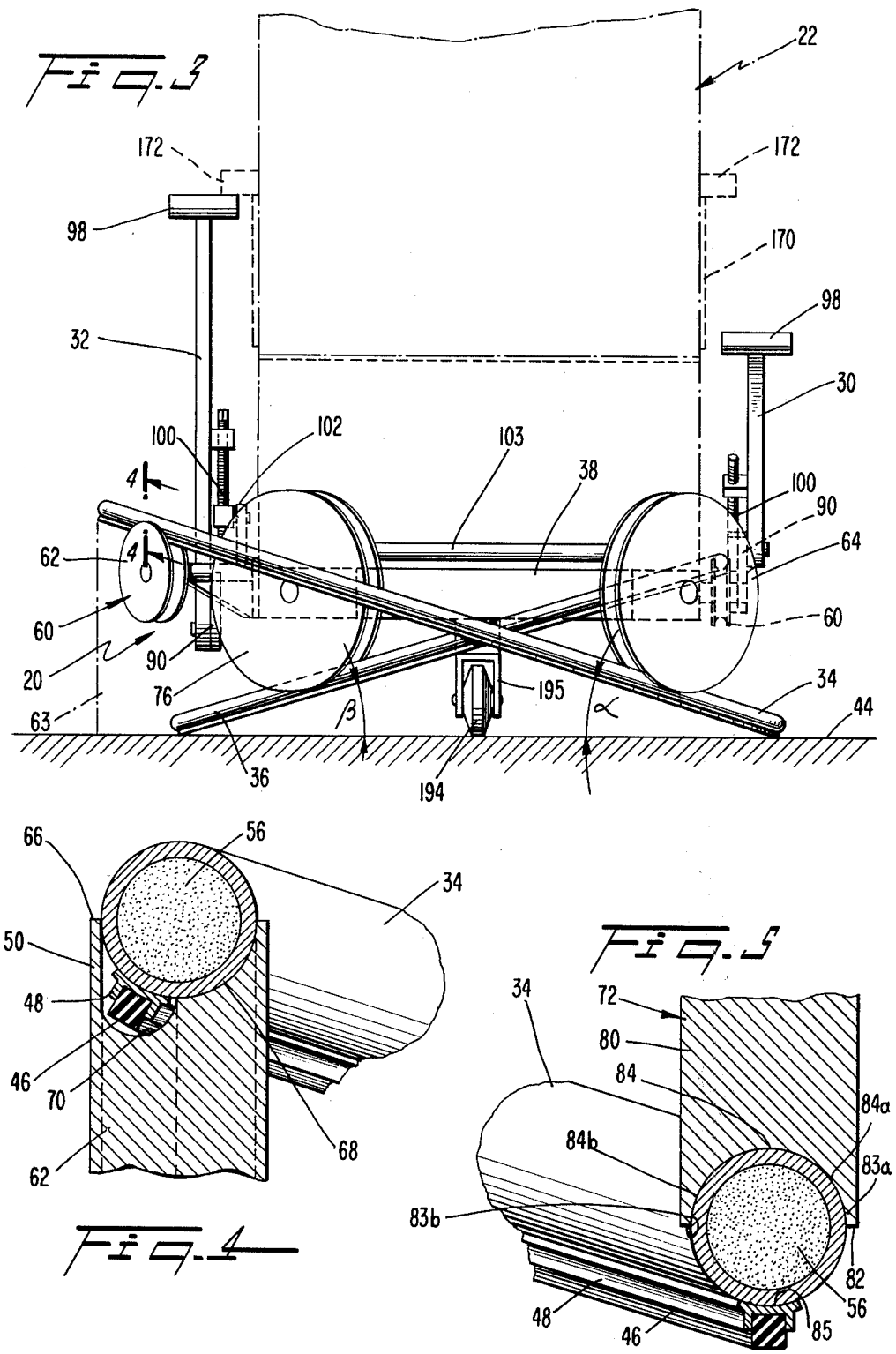

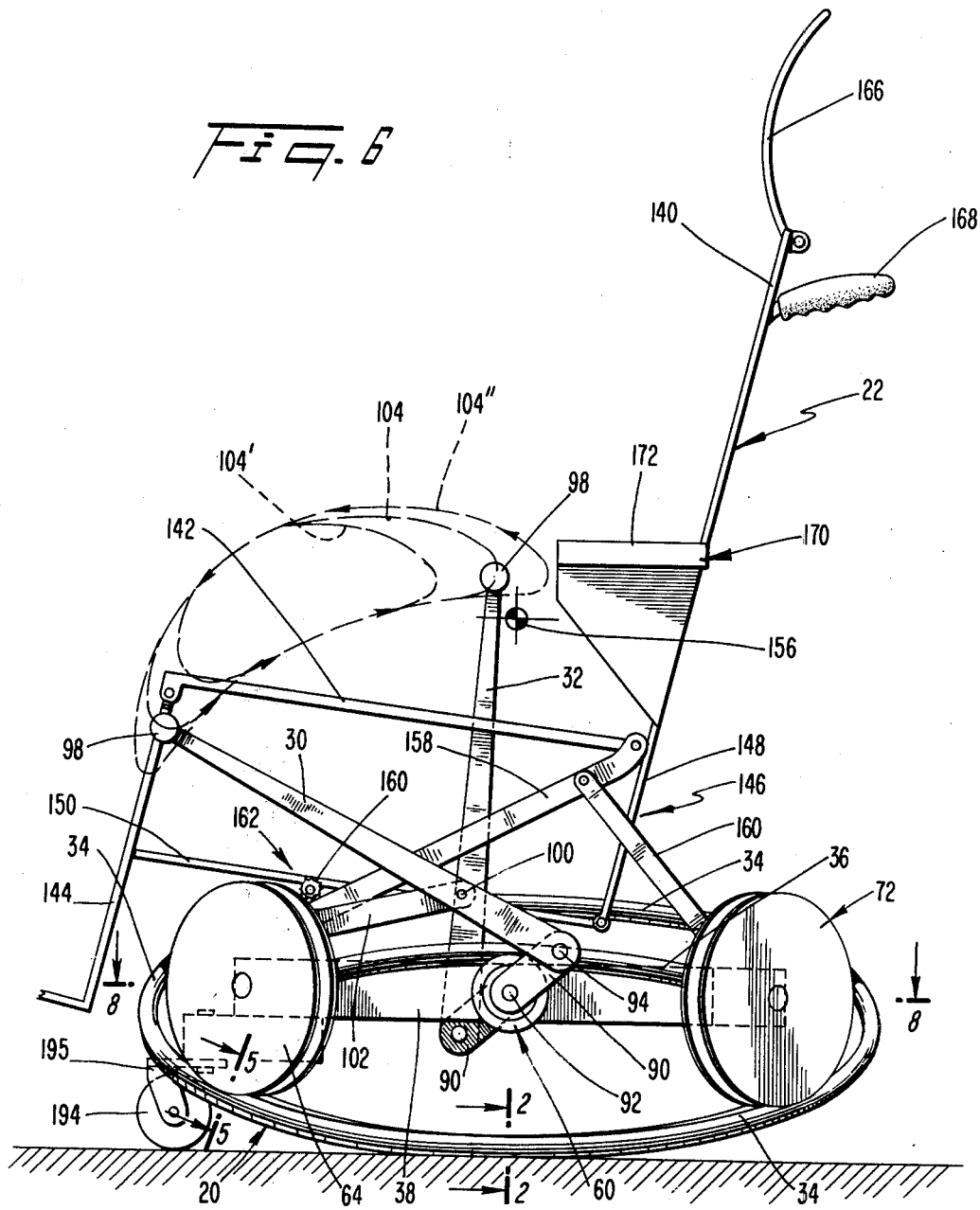

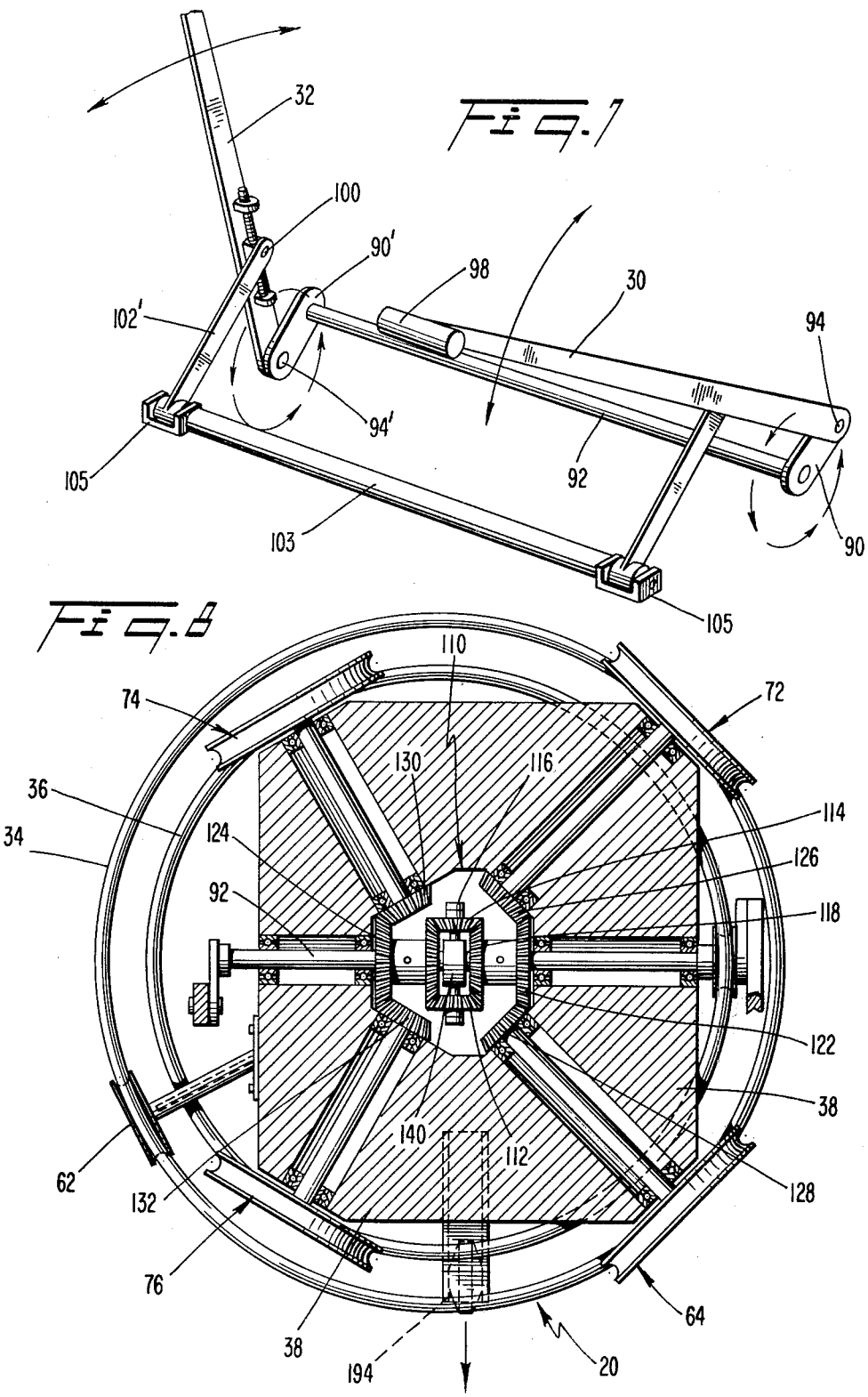

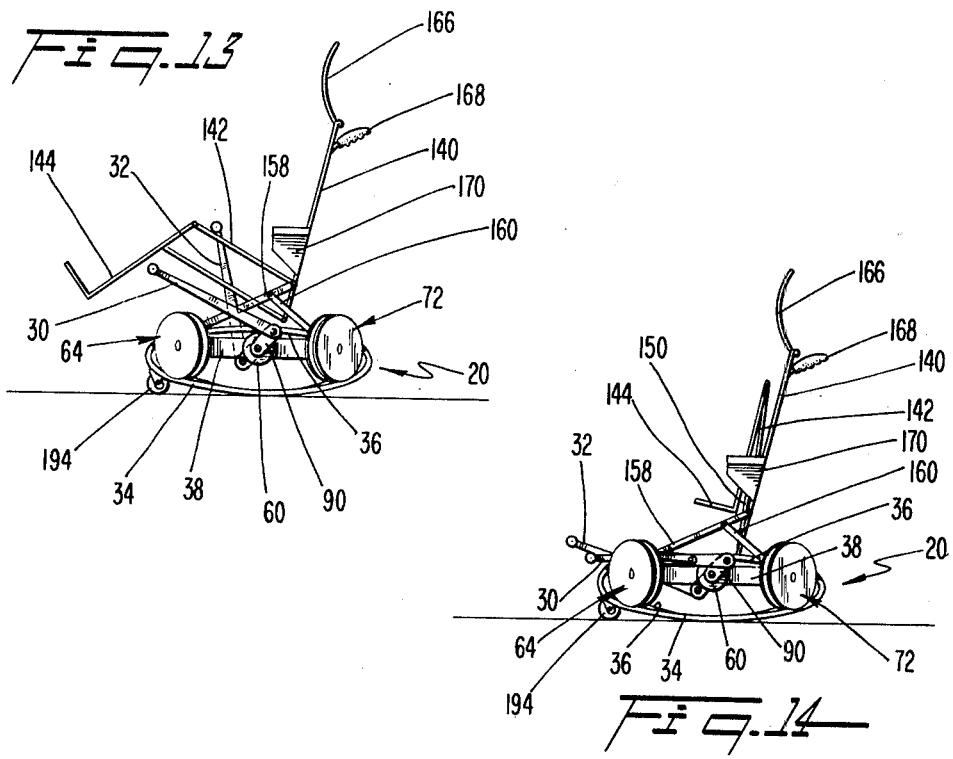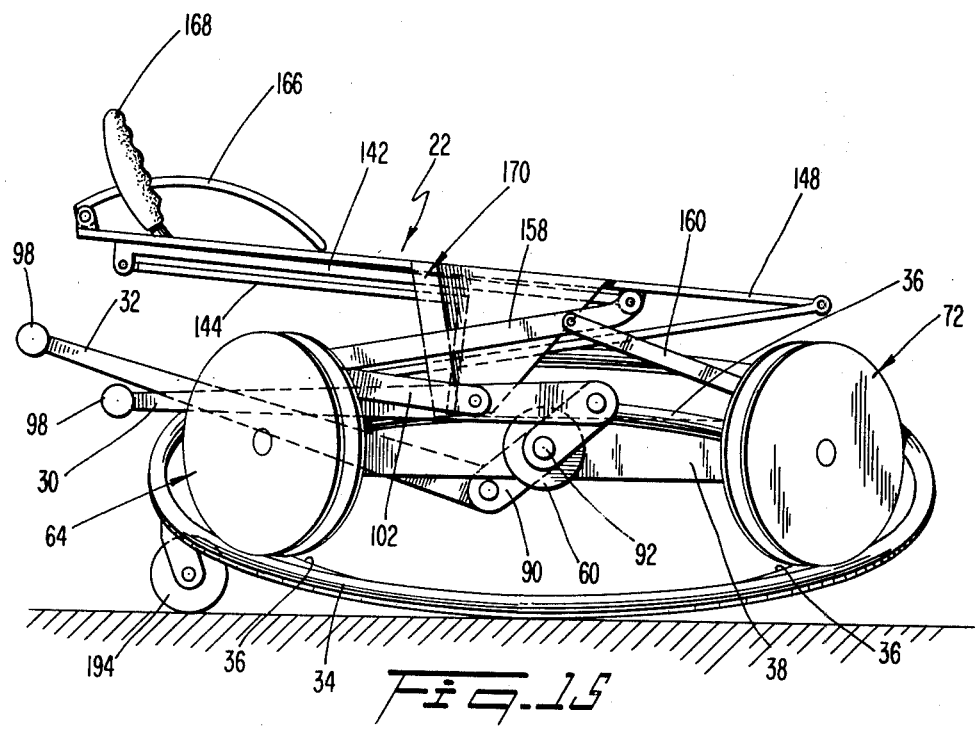

VEHICULAR SUSPENSION SYSTEM

BACKGROUND OF THE INVENTION

The present invention relates generally to a rolling suspension system. More particularly, the present invention concerns an improved wheelchair having canted wheel rolling supports.

Conventionally, suspension systems for vehicular support utilize generally circular wheels mounted on horizontal axes for rotation. These wheels typically require a fairly hard surface to support them if the vehicle carried thereby is to be easily moved. In part, this is the cause for the cement, concrete and asphalt concrete highway systems existing throughout the world.

When conventional vehicle suspension systems do not operate on a fairly hard surface, much of the energy exerted in attempting to move the associated vehicle is wasted in depressing the comparatively soft surface to make way for the rolling supports. Construction vehicles and some military equipment partially overcome this difficulty by employing fairly wide articulated treads on which more conventional rolling wheels operate to support the vehicle.

Over the years, some variety has developed in these conventional vehicular support systems. For example, there exists a vehicle using inclined elliptical wheels that present a circular elevation. These vehicles track a sinusoidal path and are useful on soft terrain, See U.S. Pat. No. 3,363,713 issued Jan. 16, 1968 to J. E. Blonsky, and U.S. Pat. No. 2,683,495 issued July 13, 1954 to J. F. Kopczynski. Both these devices include differential gearing systems to aid negotiation of curved paths.

Vehicular supports with wheels tiltable about a transverse axis and rotatable about a fixed inclined axis are also known, See U.S. Pat. No. 3,001,601 issued Sept. 26, 1961 to Aghnides and U.S. Pat. No. 912,010 issued Feb. 9, 1909 to Martin.

Other varied forms of rolling geometry have been used in castors. Even inclined support surfaces have been applied in a variety of such devices. See for example U.S. Pat. No. 2,539,108 issued Jan. 23, 1951 to Shepherd; U.S. Pat. No. 3,161,907 issued Dec. 22, 1964 to Anthony; and U.S. Pat. No. 3,928,888 issued Dec. 30, 1975 to Lapham.

While generalized rolling supports are used in a variety of vehicles, the supports heretofore used on wheelchairs for disabled persons have been comparatively limited. In fact, wheelchair design has not undergone a significant revolution at any time in recent history.

A typical wheelchair now in widespread use employs a pair of fairly large diameter wheels mounted on a horizontal axle slightly behind the wheelchair occupant and a pair of casters mounted at the forward end of the wheelchair in order to stabilize it. This particular type of a wheelchair has numerous deficiencies from the standpoint of a disabled occupant required to use the wheelchair. For example, the occupant gets very little useful exercise during propulsion of the wheelchair himself. As a result, muscles may atrophy from lack of use. In addition, the occupant cannot move his body weight relative to the chair in a manner to significantly change those portions of his body which support his weight. In such circumstances, it is difficult to maintain adequate blood circulation. This relative immobility can lead to painful adhesions in a post operative situation and other impairments because the human body works efficiently only in a dynamic environment. Still further, the wheelchair design is not readily adaptable for use with conventional furniture designed for use by non-disabled adults: for example, wheelchair seat height commonly exceeds the height of chairs ordinarily used with tables; and, wheelchair occupants cannot easily move themselves without assistance laterally to and from conventional chairs, beds, and the like.

While the foregoing discussion in itself demonstrates the need for an improved wheelchair, there are additional factors common to conventional wheelchair designs which are disadvantageous and undesirable with regard to operation. While this discussion is not intended to be exhaustive, some of the other problems associated with wheelchairs now available should be at least briefly mentioned.

For example, most wheelchairs are unstable when ascending an inclined surface. This instability requires an attendant to assist the wheelchair occupant in ascending such inclines. The cause of instability may generally be attributed to the fact that the center of gravity of the wheelchair and its occupant is above the effective center of rotation of the largest support wheel. With such a physical arrangement, coupled with the fact that the combined center of gravity of the occupant and the chair typically is positioned only slightly forward of the rear axle, an overturning force moment is permitted to exist when an unattended wheelchair attempts to ascend an inclined surface. But this axle location is necessary to permit the occupant to move the chair himself by grasping the large rear wheels.

Another aspect of conventional designs is that they are typically difficult for the occupant to propel by himself. More specifically, there is usually a circular rim laterally attached to large rear wheels which are intermittently operated by the occupant: the rim is manually gripped by the occupant, moved forward, and then released in order to propel the chair. This arrangement is objectionable not only since the chair can only be advanced at a rate at which the occupant can comfortably maintain but also because the disabled person must have coordinated use of both arms in order to effect locomotion of the chair. Moreover, the occupant wastes much energy in the intermittent operation.

Curbs and similar vertical barriers also present substantial obstacles to the known wheelchair designs. Because the wheels are circular and small enough to be manipulated by the seated occupant, it requires great effort to lift the wheelchair up a vertical obstruction. The existence of common vertical obstacles has, in recent times, been a partial impetus for placement of ramps at all curb intersections in municipal areas.

Maneuverability of existing wheelchairs is also a problem. For example, when entering closets, bathrooms, and similar confined areas, disabled persons confined to wheelchairs experience difficulty in maneuvering their wheelchairs. Part of this difficulty stems from the inability of most devices to turn about a vertical axis which is occasionally required in these difficult close-quartered situations.

Most wheelchairs employ a pair of wheels of equal diameter. It is therefore difficult to maneuver those chairs along a gradually curving path since the wheels must rotate at slightly different peripheral speeds during negotiation of a long gradual curve. This is a problem experienced in automobiles and solved there by the use of a differential gearing system in the transmission. The known wheelchair assemblies do not exhibit such flexibility in their design.

While collapsible wheelchairs are, of course, widely used by disabled persons, the collapse movement is lateral to the conventional direction of movement of the chair. This lateral collapse associated with rigidity against forward/rearward chair articulation is unnatural. Thus, these wheelchairs constrain a disabled occupant in an unnatural manner since the major joints of a disabled person typically flex about axes perpendicular to the sagittae plane. Accordingly, the lateral collapsibility of existing chairs is not amenable to permitting an adjustable seat having a plurality of positions which can be assumed by the disabled occupant.

For those wheelchair designs which do not rigidly establish the chair attitude, the design typically is not coordinated with the anatomy of the disabled occupant. One aspect of this lack of coordination concerns the potentially nauseating effect of motion on the disabled occupant. Commonly referred to as motion sickness, the nausea primarily results from oscillations of the head in a rocking motion about the horizon. Those wheelchair devices now available do not compensate for this problem.

Conventional wheelchairs also require two healthy arms for manual operation by the occupant. In many instances this requirement cannot be satisfied. Accordingly, the occupant needs the services of an attendant on almost a continual basis. Or, a special split hub contraption may be added which is expensive and interferes with the ability to collapse the chair to allow him to impart propulsion movements to either or both wheels with one hand.

In fact, conventional wheelchairs basically suffer from a common problem when a disabled person attempts to use one to lead an active life: the designs have evolved primarily for the institutionalized care of disabled persons. A preferred design would use a view toward helping disabled persons overcome the disability, maintain physical vitality, and obtain a maximum of personal mobility.

In view of the multifaceted discussion presented above, it will now be apparent to those skilled in the art that the need continues to exist for a rolling suspension system and, in particular, a wheelchair which overcomes problems of the type discussed.

SUMMARY OF THE INVENTION

In one aspect, the present invention provides a rolling suspension system which includes a pair of hoops inclined relative to one another and inclined to an underlying supporting surface. A frame supported by the inclined or canted hoops is suspended therefrom by a frame support system. In addition, the suspension system includes a system for holding the hoops in the respective inclined positions. This arrangement of a rolling suspension system can also be provided with an articulatable seat having joints foldable transversely of the preferred direction of movement for the rolling suspension system. Such a seat articulation configuration corresponds generally to the natural flexural movements of the major joints in the human anatomy while permitting the seat assembly to collapse into a compact package for stowage during transportation.

By using generally circular hoops inclined at a comparatively acute angle to the supporting surface for the rolling supports, the apparent radius of the ground-engaging hoops for stability purposes substantially exceeds the radius of any rotary member in the rolling suspension system. In this manner, the effective center can be positioned at a level corresponding to the height of the eye in a typical human being when seated in the chair without having wheel or support structures surrounding the occupant or blocking entry or exit from the seat. Moreover, the system exhibits a low profile due to the hoop inclination. In addition, stability against tipping results from the large apparent hoop radius. In fact, self righting characteristics are displayed when the center of gravity for the wheelchair and its occupant has an elevation below the apparent hoop radius.

Due to the hoop geometry, a rolling suspension system incorporating the canted hoops which is balanced for horizontal locomotion resists rolling rearwardly on an inclined plane. This fact coupled with the stability against tipping provided by the relationship between the center of gravity and the apparent hoop radius prevents the chair from tipping on all but very steep inclines and from rolling backwardly down the incline, even though the rolling suspension system is not positively braked.

In order to permit the rolling suspension system to rotate around a vertical axis, a differential gearing assembly allows both hoops to rotate in the same rotational direction which imparts a suspension centered pivoting action. Accordingly an enhancement of maneuverability results. The largely horizontal attitude of the two hoops creates a circular arc backside which reduces the plan view diagonal dimension compared with conventional wheelchairs which permits turning around in tighter quarters.

With one hoop having a larger diameter than the other hoop nested therein, the protruding or prominent hoop may function as an integral element of a climbing maneuver for scaling vertical obstacles. Accordingly, the wheelchair occupant can climb moderate vertical obstacles without the assistance of an attendant.

A differential gearing mechanism in the rolling suspension system permits the wheelchair occupant to negotiate curving paths without consciously varying the speed of the two hoops relative to one another. Thus, the differential gearing substantially enhances the variety of easily accomplished maneuvers available to the disabled individual using the wheelchair.

An manually operable drive mechanism permits the wheelchair occupant to propel the rolling suspension system. The drive mechanism itself includes a pair of levers pivoted intermediate their ends and pivotally connected to a drive wheel carried by a crankshaft, the pair of levers having a fixed phase relation to one another. This drive mechanism enhances the ability of a wheelchair occupant to propel the chair himself at a variety of speeds. Moreover, the assembly, because it induces a properly oriented curved elliptical trajectory, maximizes the efficiency of the human anatomy insofar as its relative strength in pushing and lifting are concerned.

To vary the mechanical advantage applied by the levers in propelling the rolling assembly, the location of the mid-lever pivot on each lever arm may be adjusted along the lever axis. In this manner, there results a facile adjustment in the torque and energy which can be introduced by the lever during each cycle for advancing the rolling system. Moreover, in combination with the differential gearing mechanism, the drive mechanism can be operated by only one of the levers. This facet has not been previously available in a manually propelled wheelchair without cumbersome additional mechanism.

A seat assembly for a disabled occupant preferably has a parallelogram linkage supported on the suspension system. With this arrangement, the disabled patient can articulate the seat, back and leg portions of the seat to positions ranging from the back being vertically upright to a reclined position suitable, for example, for television viewing.

The wheelchair is also designed for easy collapsibility. To effect collapse, the driving levers are first folded. Next, the seat and leg portions are raised into position parallel with the seat back. Then, the seat assembly can be rotated so as to lie compactly on the rolling suspension portion. The entire assembly can be readily transported in an automobile or stored unobtrusively in a convenient place.

BRIEF DESCRIPTION OF THE DRAWINGS

Many objects and advantages of the present invention will be apparent to those skilled in the art when this specification is read in conjunction with the drawings wherein like reference numeals have been applied to like elements and wherein:

FIG. 1 is perspective view of a wheelchair in accordance with the present invention;

FIG. 3 is a front elevational view with the seat illustrated in phantom lines;

FIG. 4 is an enlarged partial cross-sectional view taken along the line 4—4 of FIG. 3;

FIG. 5 is an enlarged partial cross-sectional view taken along the line 5—5 of FIG. 6;

FIG. 6 is a side elevational view of the wheelchair;

FIG. 7 is a schematic view illustrating the operation and adjustment of the drive mechanism;

FIG. 8 is a partial cross-sectional view taken along the line 8—8 of FIG. 6;

FIGS. 13 and 14 are schematic views showing progressive collapses of the seat assembly; and FIG. 15 is a side elevation of the collapsed wheelchair.

DESCRIPTION OF THE PREFERRED EMBODIMENT

Figure 1A:
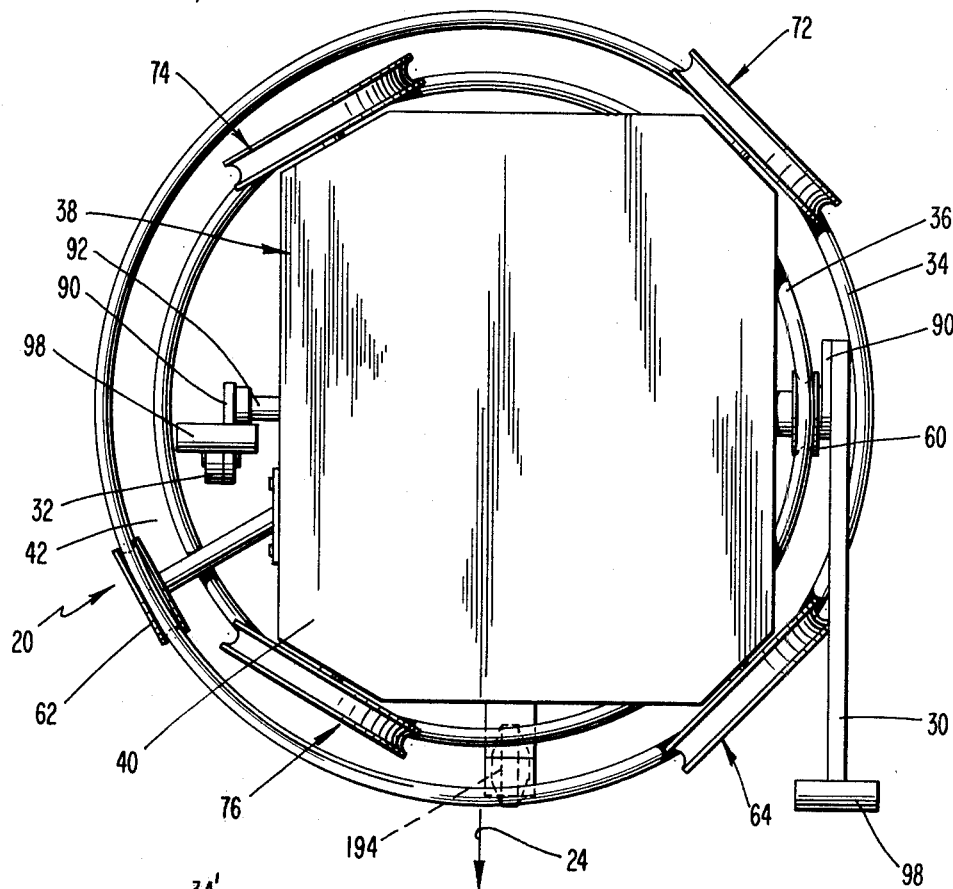
FIG. 1a is a plan view of the wheelchair with the seat removed to show the rolling suspension system.

A wheelchair in accordance with the present invention (see FIG. 1) includes a rolling suspension assembly 20 upon which an articulatable seat assembly 22 is releasably mounted. The wheelchair design aids a disabled person having use of at least one arm to perform a wide variety of maneuvers. Moreover, the wheelchair design has sensitivity to the occupant's comfort and convenience.

Basically, the wheelchair is adapted for movement along the straight line in the direction of the arrow 26 which is longitudinally oriented with respect to the seat assembly 22 as well as the rolling suspension assembly 20. However, the rolling suspension assembly 20 also permits the wheelchair to pivot about a vertical axis 24 through an angle of 360° or more, to climb vertical obstacles, to negotiate curved paths, to be propelled over a wide range of speeds and to easily traverse soft underlying surface conditions of sloped surfaces. The rolling suspension system 20 also has universal applicability as a support for a vehicle.

The wheelchair is provided with a locomotion or propulsion assembly 28 which includes a pair of lever assemblies 30, 32 that are each manually operated by an occupant seated in the wheelchair. One lever assembly 30 is provided on the left side of the chair occupant; whereas the second lever assembly 32 is located on the right side of the occupant. In order to accommodate those persons who have use of only one arm, the driving assembly 28 will propel the chair in the direction of the arrow 26 or as steered by a dominant hand steering control when one or both of the lever assemblies 30, 32 are manipulated. In the event that only one good arm is available for locomotion, the lever on the other side counterbalances the driven lever assembly and may provide passive exercise for the poor arm if the hand or arm stump of the poor arm grips, is tied or otherwise secured to the lever handle.

ROLLING SUSPENSION SYSTEM

The rolling suspension system 20 includes a pair of generally planar hoops 34, 36 each of which engages or otherwise touches the ground or another suitable supporting surface upon which the chair can roll. These hoops 34, 36 support the chair and are the rolling supports for the suspension system 20. To this end, each hoop 34, 36 rotates in a corresponding plane during suspension system movement and cooperates with a frame 38 to support the seat assembly 22. A supporting assembly is provided on the frame 38 to support at least one portion of the hoop in a position elevated above the supporting surface. In addition, the frame 38 includes an assembly for supporting the frame itself upon the pair of hoops during the movement of the wheelchair as well as during stationary use of the wheelchair.

The drive assembly 28 includes a differential gearing system that permits the two hoops 34, 36 to be driven in opposite rotational directions during straight line movement of the chair, at different rotational rates during negotiation of a curve, and the same rotational direction during rotation of the chair about the vertical axis 26.

In order to more clearly understand the structural features of the rolling suspension system 20 and the seat assembly 22, each of the primary features will now be described in detail.

FRAME

The frame assembly 38 (see FIG. 1a) has a generally flat upper surface 40 for supporting the seat assembly and a plurality of sides extending downwardly from the peripheral edge 41 thereof to provide mounting surfaces for other components. An enclosure for a differential gearing system is also provided by the frame 38.

The flat upper surface 40 provides a simple surface upon which the seat assembly 22 (see FIG. 1) may be mounted. Alternatively, any other type of vehicle may be supported by the rolling suspension system 20. Accordingly, it is expressly intended that the discussion of this rolling suspension system be viewed as applicable to any one of a wide variety of vehicles including, but not restricted to, wheelchairs.

The peripheral edge 41 of the frame 38 is configured as a polygon (see FIG. 1a), and specifically a quadrilateral. Such a configuration allows the frame to extend far enough laterally and longitudinally to support the various structural elements and bearings required by the rolling suspension system 20 so as to provide a stable surface for vehicular support.

Extending forwardly from a lower portion of the frame 38 is a caster assembly 194. This caster assembly 194 includes a clevis mounted rotatable wheel (see FIG. 3). The clevis 195 is itself mounted for rotation about a horizontal axis so that the caster wheel can move between two positions: one position engaging the supporting surface 44; and a second position spaced above the supporting surface so as to be free of contact therewith.

If desired, the frame 38 need only be deep enough to enclose a driving mechanism for the hoops. The caster assembly 194 would thus be mounted on the bottom of the frame 38 and with other members being mounted either above or below the frame 38.

GROUND-ENGAGING HOOPS

As may be seen from FIG. 1a, each of the ground-engaging hoops 34, 36 is generally circular in nature. Each of the hoops 34, 36 appears slightly elliptical in this top view as illustrated in FIG. 1a with a major axis generally parallel to the longitudinal direction 24 and a minor axis generally perpendicular or transverse thereto. Each generally circular hoop 34, 36 is inclined relative to a supporting surface such as the ground and, when viewed from above, this inclination causes the slightly elliptical appearance to the hoops 34, 36.

Figure 2:
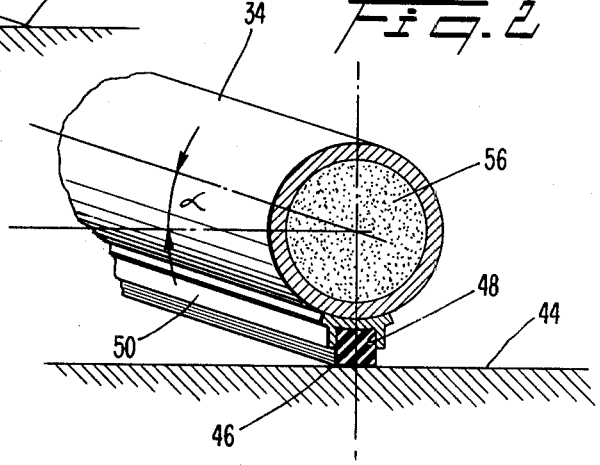
FIG. 2 is an enlarged cross-sectional view taken along the line 2—2 of FIG. 6.

Each hoop 34, 36 is preferably fabricated in a toroidal shape from a tubular member (see FIG. 2) having a circular cross section with uniform wall thickness. Alternately, the cross section may include an integrally formed tire recess feature. If an integral tire retention recess is formed into the tire cross section usually an extra symmetrically located redundant recess is also required to maintain balanced bending stiffness and thereby avoid a tendency to twist when it is bent into the circular hoop shape. Symmetry of the annular cross section provides uniform bending characteristics to the hoop 34 to allow the hoop to be formed from a tubular member.

The hoop 34 is vertically spaced above the supporting surface 44 and is mounted in a groove 48 of a tire mounting bead 50. This tire mounting bead 50 may be welded or otherwise suitably secured around the peripheral surface of the hoop 34 such that the tire 46 will be disposed vertically on a line 52 passing through the center of the tubular cross section. In this manner, the tire 46 rests perpendicularly on the surface 44 and will be in compressive bearing engagement with the supporting surface 44 when that portion of the hoop immediately thereabove is closest to the supporting surface 44. The primary purpose of the rubber tire is to provide a high coefficient of friction for traction. Moreover, the tire 46 cushions the hoop against impulsive forces and allows quiet movement of the rolling suspension system 22. One advantage of the mounting bead 50 is that it can be roll formed in an inexpensive manner from sheet stock.

The interior portion of each hoop 34 may be filled with a suitable conventional sound dampening material 56. This material dampens acoustical frequency vibrations of the tubular cross section that might otherwise sustain regenerative acoustical noise. Of course, sound attenuation is also enhanced by the presence of the tire 46 fashioned from a synthetic resinous material, rubber, or a similar material. As a result of hoop construction, small obstructions on the supporting surface 44 do not give rise to direct contact with the tubular cross section of the hoop 34.

The centerline of each hoop 34, 36 (see FIG. 3) lies within and defines a corresponding inclined plane. The plane of hoop 34 is inclined at an acute angle $\alpha$ with respect to the supporting surface 44. Similarly, the plane of the other hoop 36 is inclined relative to the supporting surface 44 by an acute angle $\beta$. In addition, the plane of the hoop 34 intersects the plane of the hoop 36 at a location beneath the seat assembly 22. These intersecting planes define an imaginary straight line which runs in the longitudinal direction of the rolling suspension system 20 and is spaced above the supporting surface 44 so as to be generally parallel thereto.

The angles $\alpha, \beta$ defined between the supporting surface 44 and the first, or prominent, hoop 34 and the second, or protected, hoop 36 may be equal or may be selected at any desired value. The criteria for selecting the angles $\alpha, \beta$ basically relate to necessary operating characteristics for a vehicle supported by the rolling suspension system 20. For example, the wheelchair must be capable of passing through conventional doorways having a width of approximately 30 inches. Therefore, the maximum lateral distance between the side portions of the prominent hoop 34 must be less than 30 inches in order to permit passage through doorways.

Another important factor in determining the inclination angles $\alpha, \beta$ is placement of the apparent radius of curvature for the hoops 34, 36. In elevation (see FIG. 6) the hoops 34, 36 present an elliptical profile with a major axis whose length is the hoop diameter d and a minor axis whose length is D sin (or D sin $\beta$). It can however be analytically demonstrated that the radius of curvature for such an ellipse at a point on the minor axis is $R/\sin \beta$. Thus the apparent radius of curvature exceeds the radius of the hoop itself. To provide self-righting, the apparent radius of curvature must be positioned above the combined center of gravity for the wheelchair and its occupant.

The angle of inclination $\beta$ (see FIG. 3) for the protected hoop 36 may be selected so that mechanical elements of the driving mechanism can lie within a common plane.

During forward movement of the rolling suspension system 20, each hoop 34, 36 rotates about its center in its respective plane: the prominent hoop 34 (see FIG. 1a) rotates in a counterclockwise direction; whereas, the protected hoop 36 rotates in a clockwise direction. During straight horizontal movement of the rolling suspension assembly 20, the surface speed of both the prominent hoop 34 and the protected hoop 36 is the same. Accordingly, since the diameter of the prominent hoop 34 exceeds the diameter of the protected hoop 36 in order to permit the nested relationship between the two hoops, the angular velocity of the prominent hoop 34 in its plane will be lower than the angular velocity of the protected hoop 36 in its plane.

It is also to be noted that the rolling suspension system 20 is capable of movement about a vertical axis. In this operational mode, both the prominent hoop 34 and the protected hoop 36 rotate in the same directional sense relative to the frame 38. This movement is in fact a relative movement between the hoops 34, 36 and the frame 38: for example, the hoops actually rotate very little relative to the supporting surface whereas the frame 38 itself would rotate much more quickly about its vertical axis relative to the suporting surface.

For the hoops to obtain the nested relationship described above, it will be apparent that at least the prominent hoop essentially comprises an annular toroidal ring devoid of spokes, webs, or similar structural members extending from the periphery of the hoop toward its center of rotation. Moreover, this nested relationship makes a laterally compact assembly.

HOOP SUPPORT ASSEMBLY

As noted above, each hoop 34, 36 is supported in its inclined orientation (see FIG. 3) relative to the underlying support surface 44. To maintain the inclined orientation of each hoop 34, 36, a hoop support assembly 60 is provided for each hoop 34, 36. The primary function of the hoop support assembly 60 is to maintain one portion of the corresponding hoop at a substantial elevation relative to the supported surface 44. To effect this result, each hoop supporting assembly 60 is preferably carried by the frame 38 in a position underlying the corresponding hoop remote from the point of contact between the hoop and the support surface 44.

The support assembly for each hoop may, for example, comprise a generally circular idling wheel 62 mounted on a shaft suitably supported from the frame 38. The idling wheel 62 is not required to resist a particularly large force due to leverage provided by the hoop. More particularly (see FIG. 1b), a force 64' is exerted on the hoop 34' by the combined weight of the wheelchair and its occupant. This force 64' is supported by the inclined hoop 34' and is applied at a position fairly close to the point 66' at which the hoop 34 contacts the supporting surface 44'. From elementary engineering principles, the magnitude of the reacting force 62' which must be exerted by the idling wheel 62 is substantially less than the magnitude of the force 64' generated by the weight. Accordingly, it will be seen that the hoop functions as a lever about the point of ground contact 66'.

In the actual rolling support assembly 20 (see FIG. 3), each hoop 34, 36 supports about half of the combined chair-occupant weight. Accordingly, it will be seen that with the lever effect, the idling wheel 62 of the prominent hoop 34 may support only, for example, one eighth of the force supplied to the hoop 34 by the frame support means 64 or one sixteenth of the combined weight. Corresponding considerations also apply for the protected hoop 36.

The idling wheel 62 for the dominant hoop 34 (see FIG. 1a) is, in the plan view, positioned forwardly of the minor axis of the dominant hoop 34. In a simple rolling suspension system, this idling wheel 62 may be positioned precisely on the minor axis of the dominant hoop 34. But, for a wheelchair application, it is preferably located forwardly of the minor axis to enhance the obstacle climbing capabilities of the wheelchair. In this connection, the idling wheel 62 (see FIG. 3) should be positioned so that a vertical line 63 dropped from the prominent hoop 34 at its maximum elevation above the supporting surface 44 is free of interference from the idling wheel 62.

As shown in FIG. 4, each idler wheel 62 includes a peripheral surface 66 that is cylindrical and is provided with a hoop-receiving groove 68. At least a portion of this hoop-receiving groove 68 is adapted to directly engage and support the external surface of the tubular portion of the hoop 34. In addition, the groove 68 may include an undercut portion 70 that provides a relieved area to receive the tire 46 as well as its supporting bead 50. The undercut portion 70 avoids scuffing between the groove 68 and the tire 46 with its support 48. The idler wheel for the protected hoop 36 is constructed essentially in an identical fashion to the idler wheel 62 for the prominent hoop 34, but is physically positioned on the other side of the frame means 38 on the minor axis of the protected hoop 36.

FRAME SUPPORT ASSEMBLY

The frame 38 (see FIG. 1a) also carries a plurality of frame support assemblies 64, 72, 74, 76. Each frame support assembly is mounted at a side surface of the frame 38 and engages a corresponding hoop 34, 36. Specifically, the frame support assemblies 64, 72 engage the prominent hoop 34; whereas, the frame support assemblies 74, 76 engage the protected hoop 36.

As shown most clearly in FIG. 1a, the point of tangential contact between each of the frame support assemblies and the corresponding hoop occurs such that a generally quadrilateral area is defined between these contact points. This quadrilateral area defines a stabilization arrangement to safely support a wheelchair seat assembly against tipping. Provided that the combined center of gravity for the occupant and the wheelchair assembly falls within this quadrilateral area, the wheelchair will be stable against tipping both laterally and longitudinally. Moreover, with the self-righting characteristic discussed above, the wheelchair can safely be used as a rocking chair.

As an alternative embodiment, a single frame support assembly might be provided on the protected hoop 36 so as to define a triangular area within which the center of gravity must lie.

As depicted in FIG. 3, each drive wheel 80 of a frame support assembly contacts its corresponding hoop 34, 36 at approximately the same vertical elevation above the supporting surface 44. Thus, with all drive wheels having the same diameter, their respective support shafts lie in a common plane parallel to, but spaced above, the supporting surface. Such an arrangement simplifies arrangement of the mechanical drive mechanism.

Moreover, the elements of each frame supporting assembly 64, 72, 74, 76 can be interchangeable when the hoops 34, 36 are contacted at the same vertical elevation leading to economy in production costs. As this arrangement is preferred, it will suffice to describe in detail one of the frame support assemblies 64, it being understood that the others are identical.

The frame support assembly 64 includes a drive wheel 80 mounted for rotation with a horizontal shaft protruding from the frame 38. Each drive wheel 80 (see FIG. 5) has a peripheral surface 82 which is generally cylindrical. The cylindrical surface 82 includes a hoop receiving groove 84 that contacts the corresponding hoop 34 with sufficent frictional contact to drive the hoop 34. The outer portion 84a of the groove 84 (i.e., toward the outside of the hoop) may be designed to contact the hoop surface from the top edge of the hoop 34 to a point on the surface spaced 90° from the top edge and tangent to a vertical line so that the area on which friction acts is maximized. The inner portion 84b of the groove 84 (i.e., inside the hoop) must be at least partially relieved from contact with the hoop: this relief allows the drive wheel 80 to rotate along the non-coplanar curvature of the hoop without binding or scuffing.

To minimize lateral disengagement of the drive wheel 80 from the corresponding hoop 34, flanges 83a, 83b extend radially past the top edge of the hoop. Preferably, the cylindrical surface 82 will be located in alignment with a diameter of the hoop cross section at the point of contact to meet the above condition. Of course, the flanges 83a, 83b may be longer. But in this event, the flanges should not project below the bottom edge 85 of the hoop surface itself: otherwise the hoop flanges may be easily damaged due to the laterally unsupported exposure deformation forces.

As an enhancement to the frictional contact between the drive wheel 80 and its associated hoop 34, either or both the groove 84 and the hoop upper surface may be roughened. For example, shallow transverse serrations might be provided.

As seen in FIG. 8, each drive wheel of the frame support assemblies 64, 72, 74, 76 is carried on a corresponding shaft extending through a side of the frame assembly 38. The angular relationship between the shafts is determined so that all shafts can lie in a common plane, all drive wheels can be of the same diameter, all drive wheels contact their respective hoops so that the drive wheel centers are all at the same elevation above the supporting surface, and the lateral and longitudinal dimensions of the quadrilateral support area are maximized.

LOCOMOTION ASSEMBLY

To self-propel the rolling suspension system 20 and the wheelchair, an improved manually operable drive system is provided in accordance with this invention. The propulsion or drive assembly 28 (see FIG. 8) includes a pair of drive cranks 90, 90' mounted 180° out of phase on opposite ends of a crankshaft 92. Each crank 90, 90' has an eccentric crank pin 94 located on a fixed pivot diameter. One end of a corresponding lever arm 30, 32 is attached to each crank pin 94. The second end 98 of each lever arm is adapted to be manually engaged by the corresponding hand of the wheelchair occupant in order to drive the corresponding crank 90. Between the ends of the lever arm 30, a fixed pivot 100 is connected to the lever arm. Each pivot 100 is attached to a corresponding link 102, 102' which has a T-shaped end.

Turning now to FIG. 7, the crankshaft 92 extends transversely of the rolling suspension assembly 20, the driving cranks 90, 90' being at each end thereof. The crank pin 94 carried by the crank 90 is 180° out of phase with the crank pin 94' carried by the driving crank 90'. The pivot links 102, 102' each provide a fixed position for the corresponding pivot 100, 100' on the corresponding lever arm 30, 32. In this manner, the driving relationship between the lever arms 30, 32 is mechanically and rigidly fixed for all phases of operation.

Each T-shaped end of the links 102, 102' is rotatably connected to a lateral bar 103. Moreover, each T-shaped end is received in a corresponding cross-slotted block 105, 105' attached to the frame. One slot of each block 105, 105' is aligned with the lateral bar 103 and is open vertically upward. This arrangement allows the bar 103 to be lifted out during lever arm collapse. In addition, each block 105, 105' has a second slot aligned with the associated link 102, 102'. This second slot is also open vertically upward and accommodates rocking movement of the link 102, 102' during operation of the lever arms 30, 32.

It is possible to obtain an infinitely variable adjustment in the mechanical advantage applied to the drive cranks 90, 90' by the lever arms 30, 32 by moving the location of the pivot 100 between the pivot arm 102 and the levers 30, 32. This adjustment may be effected by mounting the pivots 100, 100' on corresponding rotatable threaded shafts (schematically shown in FIG. 7) carried by the arms 30, 32 and mounted longitudinally thereon. Each rotational movement of handwheels on the threaded shafts then allow adjustments of the pivots 100, 100' relative to the crankshaft 92 for balanced changes in mechanical advantages.

Adjustment of the pivot points 100, 100' longitudinally of the lever arm 30, 32 (see FIG. 6) changes the mechanical advantage applied to the drive cranks 90, 92' and provides a continuum of operating positions. Simultaneously, the path traversed by the hand-operated end 98 of each crank arm 30, 32 traverses a different path. With the pivot 100 located as illustrated in FIG. 6, the handles 98 traverse a closed looping path 104 which may be described as a cambered ellipse.

As used herein, cambered ellipse is intended to refer to a closed path described by the face end of an arm, the other end of which is eccentrically mounted for rotation about an axis, the arm being pivoted about a point between its ends. Thus, the path 104 is such a cambered ellipse where the pivot is fixed on the arm and the pivot itself moves in an arcuate path.

Studies of the strengths and weaknesses of the human body have shown that the arm is approximately three times stronger in pushing/pulling movements than it is in raising/lowering movements. To accommodate these facts, the cambered elliptical path is designed to be approximately three times longer than it is high. In effect, this relationship maximizes relative anatomical strengths and weaknesses of the occupant's arms. In the apparatus itself, the location of the pivot points 100, 100' on the lever arms 30, 32 effectively proportions the cambered elliptical path to any occupant's needs.

If the pivot point 100 is moved toward the handle 98 (see FIG. 6), the mechanical advantage applied to the driving crank 90 is reduced and the handles traverse a shorter path 104'. With this shorter path, a higher speed of crankshaft rotation is possible by the operator; and, lower torque is available to the hoops. Conversely, if the pivot 100 is moved more closely to the pivot point 94 on the driving crank 90, the handles 98 will describe a longer path 104" providing greater torque and greater power to move the rolling suspension assembly, but, at a lower speed.

DIFFERENTIAL GEARING ASSEMBLY

To enhance wheelchair maneuverability, to provide a two-wheel traction drive, and to allow self-propulsion by a disabled person having the use of only one arm, the rolling suspension system 20 is provided with a differential gearing assembly 110 (see FIG. 8). The differential gearing assembly includes a pair of planetary bevel gears 112, 114 carried by a planetary gear cage 116 which is selectably connectable with the crankshaft 92 driven by the crank arms 96. In this manner, rotary power from the crankshaft 92 can be input directly to the planetary gear cage 116 so as to rotate a pair of meshed bevel gears 118, 120 of the assembly 110. The bevel gears 118, 120 are each in meshed engagement with both planetary gears 112, 114 and are driven as output gears in counter-rotating directions as the planetary cage 116 rotates. Each of the bevel differential gears 118, 120 connects with and drives a corresponding conical friction roller drive system 122, 124.

Each friction drive system includes a driving roller disposed between a pair of driven rollers. Driven rollers 126, 128 straddle the driving roller of system 122; whereas, driven rollers 130, 132 straddle the drive roller of system 124. The driven members 126, 128, 130, 132 are each attached to a corresponding shaft which directly drives a drive wheel 80 of the corresponding frame support assembly 72, 64, 74, 76, respectively.

Suitable conventional bearing mounts may be provided on the frame 38 for the splayed drive assembly shafts and the crankshaft 92 to permit shaft rotation while maintaining the necessary engagement between driving and driven elements.

In order to adjust peripheral speeds of the hoops so as to negotiate curves, a braking means may be provided to selectively engage one or the other of the output differential gears 118, 120. This brake might, for example, comprise a yoke-mounted friction member 140 carried at the center of the differential 110. Thus, by engaging the friction brake 140 with one of the differential gears 118, 120, the engaged gear is comparatively slowed and the input power is proportionately distributed to the other differential gear by the planetary cage 116. The amount of braking force applied will control the radius of the turn and preferably could be sufficient to stop one differential gear 118, 120 entirely so that the suspension system can turn around one of the hoops.

Control means for the friction brake 140 can be advantageously placed at the handle 98 of the lever arm 30 used by the occupant's dominant arm. This placement makes the control means accessible as well as easily manipulatable by the occupant. The control means may, for example, tilt to the occupant's left to negotiate a left hand curve and to the occupant's right to negotiate a right hand curve. The degree of braking in the differential gearing assembly is regulated by the degree of tilt of the handle 98. When it is desired to brake both hoops simultaneously, the control means can be flexed rearwardly relative to its lever arm 30 so that both output gears of the differential assembly are simultaneously retarded.

In order to permit rotation of both hoops in the same direction so as to effect rotation of the wheel chair about a vertical axis, the crankshaft 92 may also be selectively engaged directly with one of the differential gears 118, 120. In this operating mode, the crankshaft 92 and the planetary gear cage 116 are disconnected and the cage 116 is restrained from movement.

Since the crankshaft 92 provides the rotational drive to the differential gearing assembly 110 in both the co-rotating hoop mode and the counter-rotating hoop mode, rotation of the shaft is all that is required to propel the rolling suspension system 20. Accordingly, the rotation of the crankshaft can be caused by one or both of the lever arms 30, 32 and still provide the desired maneuverability. Moreover, a motor may be connected in driving relation to the shaft 92 for those disabled persons who have no strength in either arm.

To brake movement of the rolling suspension system, the lever arms 30, 32 may be stopped. Alternatively, a braking device can be applied to the crankshaft 92.

To obtain passive exercise during wheelchair movement by a motor, the occupant need only grasp the lever arm handles. Alternatively, the occupant's hands might be tied to the lever arm handles.

While the input drive to the splayed shafts for the frame support assemblies has been described above as conical friction rollers, the drive could, of course, consist of a meshed beveled gear arrangement or any similar angle drive system.

THE SEAT ASSEMBLY

The seat assembly 22 (see FIG. 6) includes a back portion 140 which is pivotally connected to a seat portion 142 that, in turn, is pivotally connected to a leg support portion 144. To accommodate adult individuals of different physical proportions, both the seat portion 142 and the leg support portion 144 are adjustable, lengthwise. Accordingly, the chair can be adjusted to a wide variety of body proportions without redesigning the seat assembly.

Moreover, the pivotal connections between adjacent portions of the seat assembly 22 extend transversely thereof in a direction generally parallel to the axis of flexion for knee and hip joints in the human anatomy. Accordingly, relative movement between the seat back 140, the seat 142 itself, and the leg support 144 occurs in a natural fashion so as to provide a maximum amount of comfort to the disabled occupant. In addition, this movement also enables the occupant to shift body weight to different parts of his body to promote blood circulation, avoid fatigue, etc.

To support the seat assembly 22 relative to the rolling support assembly 20, there are a pair of four-bar parallelogram mechanisms 146, one on each side. Each parallelogram linkage 146 is a mirror image of the other, thus a description of one will suffice.

Each linkage 146 may include the seat bottom 142, the leg support 144, an extension 148 of the seat back, and a parallel connecting link 150 extending between the back extension 148 and the leg support 144 in a direction parallel to the seat bottom 142. These elements of the linkage 146 are, of course, pivotally connected in a parallelogram form. As a result, articulation between the seat back 146 and the seat bottom 142 is accompanied by articulation between the seat bottom 142 and the leg support 144, and vice versa.

Figure 9:
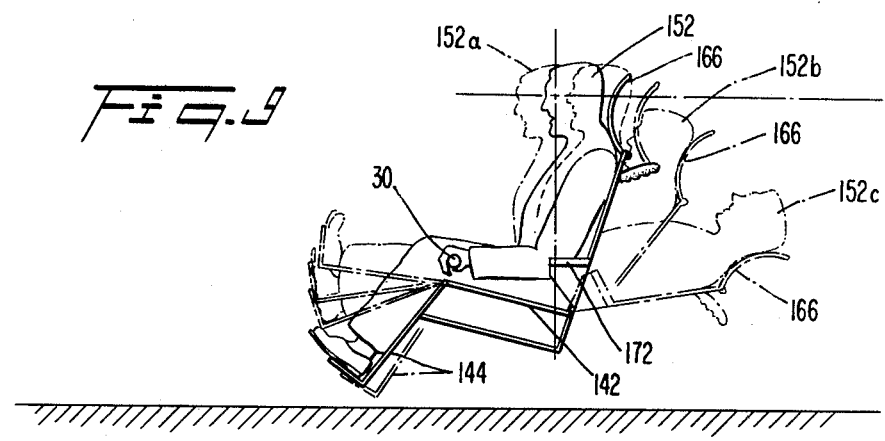
FIG. 9 is a schematic view illustrating operation of the seat articulation assembly.
Figure 10:
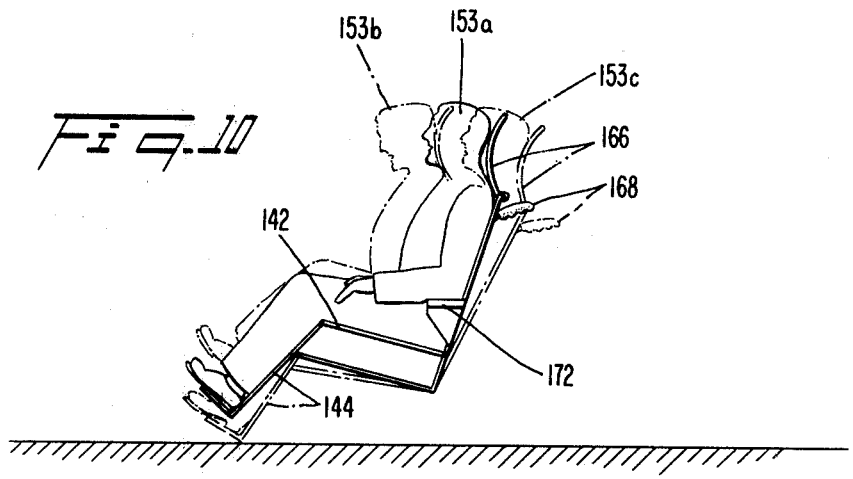
FIG. 10 is a schematic view illustrating rocking of the seat assembly.

Turning now to FIG. 9, the range of articulated positions is illustrated. For example, the normal position 152 can be adjusted forwardly to a vertically upright position 152a suitable for use at a table or desk. When it is adjacent forwardly with the caster wheel retracted the wheelchair also moves forward and the unit rocks forward leaving the patient's feet on the foot rest resting on the floor and the wheel hoops locked to the floor against rotation. Or, it can be adjusted rearwardly to a partially reclined position 152b suitable for reading or watching television. The seat 22 can also assume a fully reclined position 152c useful in sleeping, resting, etc. When assuming the vertically upright position 152a, the caster assembly 194 (see FIG. 3) will be placed in its non-ground contacting position to permit forward rotation of the chair relative to the hoops 34, 36.

So that the combined center of gravity 156 for the occupant and the wheelchair itself does not undergo significant excursions forwardly or rearwardly of a vertical plane through the hoop centers and the crankshaft axis, the pivot between the seat bottom 142 and the seat back 140 is spatially fixed. The pivot is supported by a collapsible link 158 which is pivotally connected at a forward end of the frame and to the joint between the seat 142 and the back 140. To elevate the collapsible link 158, a prop link 160 extends from the rear portion of the frame 38 into supporting relation with the link 158. The prop link may engage a serrated surface to provide a range of vertical seat height positions. This arrangement of the links 158, 160 is primarily useful in collapsing the wheelchair for storage or automotive transportation.

The second point support for the linkage 146 is also the attitude adjustment mechanism 162. This mechanism may be located at the forward end of the frame 38 and includes an operating handwheel 164 which operates a vertical screw assembly to adjust the vertical spacing between the link 150 and the frame 38. The link 150 may frictionally engage this screw assembly so as to be movable therearound. To allow seat attitude to undergo adjustment during seat articulation, the link 150 may be cam shaped. Moreover, preferred positions for the seat articulation can be arranged in that same surface by suitably located detents.

If desired, the seat back 140 may also include an adjustable head rest 166. This head rest may be articulated in a suitable conventional manner either simultaneously with seat articulation or independently thereof.

In addition, the seat back 140 will ordinarily be provided with attendant handles 168, one positioned on each side of the back 140.

Also, the seat back 140 may include arm rests 170 which are mounted so as to provide a comfortable support for the occupant. Moreover, each arm rest 170 may include a pivotally attached extension 172 which is movable between a stowed position when the lever arms are being used and an extended position when the lever arms are not being manipulated for propulsion or exercise.

OPERATION

Figure 11:
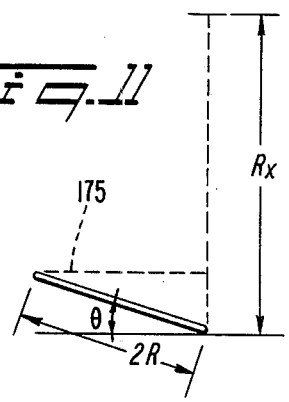
FIG. 11 is a schematic illustration of the relationship between the actual and apparent radii of curvature for an inclined hoop.

As an aid to understanding the self-righting characteristics of the wheelchair of the present invention, FIG. 11 illustrates the relationship between the effective radius $R_a$ of a hoop 175 inclined at an angle $\theta$ relative to a supporting surface. For purposes of illustration, the hoop 175 is considered to have a diameter equal to 2R, R being the hoop radius. As graphically illustrated, the effective radius for the hoop lying on its side is substantially greater than the actual radius of the hoop.

In side elevation, as seen in FIG. 6, each of the generally circular hoops presents an elliptical projection. The minor axis of this elliptical projection can be shown by elementary trigonometric considerations to be equal to $R \times \sin \theta$. As noted earlier, it can be rigorously shown that the radius of curvature at the minor axis of such an ellipse is $R/\sin \theta$. Accordingly, the shallower the inclination of the hoop with respect to the horizontal, the greater the apparent effective radius. In FIG. 6, the point 180 corresponds to the apparent center of curvature of the prominent hoop 34. There is also an effective radius for the smaller hoop. It is the design intention to make the average effective radius of the two hoops equal to the average eye height of an adult seated occupant. It will be seen in addition, that this point 180, the average effective radius, is in general horizontal alignment with the location of the eye 182 of a seated occupant. With this orientation, sickness inducing motions are not perceived by the eye or sensory organs in the wheelchair occupant's head. Accordingly, there is no tendency for the wheelchair occupant to become nauseous during movement of either the chair or the occupant which might tilt the occupant.

In addition, the center of gravity 156 for the occupant and the chair is substantially below the elevation of the point 180 and in vertical alignment therewith. With the center of gravity 156 disposed below the apparent center of curvature 180, a perturbation of the wheelchair from vertical is accompanied by an opposing force moment generated by the center of gravity which tends to right the chair. And, when placed on an inclined supporting surface, the wheelchair will rock to a position where the center of gravity 156 is in direct vertical alignment with the apparent center of curvature 180. Accordingly, the chair is free to rock in the sense of a rocking chair about a central position (see FIG. 11) and will also stabilize itself on an inclined plane, but in a position somewhat different than if it were on a horizontal flat surface.

In order to propel the chair along a plane surface in a straight direction, the wheelchair occupant engages the handles 98 of the lever arms 30, 32 and applies force generally tangential to the handle trajectory which moves them along the cambered elliptical path 104. In so doing, clockwise movement of the handles around the cambered elliptical path 104 corresponds to forward movement of the wheelchair because there is a direction reversal between the crank shaft and drive rollers. Conversely, counterclockwise movement of the handles 98 through the path 104 corresponds to rearward movement of the wheelchair.

In either event, the movement of the crank handles causes the lever arms 30, 32 to rotate the corresponding cranks 90, 90' and the associated crankshaft 92.

Turning now to FIG. 8, rotary movement of the crankshaft 92 is transferred to the planetary gear cage 116 causing equal rotations in the output differential gears 118, 120. Rotation of the gear 118 causes the wheels 80 of the frame support assemblies 64, 72 to operate in one rotational sense; likewise rotation of the differential gear 120 causes the frame support assemblies 74, 76 to rotate in the opposite directional sense. Accordingly, the hoops 34, 36 rotate at equal peripheral speeds but in opposite directions. In so doing, the support assemblies 64, 72 (see FIG. 6) continually move forwardly on the prominent hoop 34 while the other frame support assemblies 74, 76 advance on the protected hoop 36. Thus, movement of the hoops 34, 36 corresponds generally to that of the continuous track on a tracked vehicle.

When it is desired to negotiate a curve, the control means handle 98 is tilted in the desired direction to retard one differential gear 118, 120 path with the braking assembly 140. Accordingly, the movement of the planetary gear system 116 transfers additional power to the opposite differential gear causing the hoop on the outside of the curved path to rotate at a slightly higher peripheral speed. In this manner, even with continued operation of the lever arms 30, 32 at the same speed, the wheelchair negotiates a smooth curve at the same average velocity as when it was moving straight ahead. In the event that it is desired to turn sharply about one side of the chair, the corresponding differential gear 118, 120 is entirely stopped by the braking member 140 so that the chair can rotate around the stopped hoop.

Should it be desired to rotate the chair about a vertical axis, for example during a close-quartered maneuver in a closet or a similar confined area, the planetary gearing 116 (see FIG. 8) is disconnected from crankshaft 92 and stopped while the crankshaft 92 is drivingly interconnected with one of the differential gears 118, 120. In this mode, the hoops 34, 36 are driven in the same rotational direction (see FIG. 8) when viewed from above so that the wheelchair rotates around a vertical axis.

In order to climb a vertical obstacle between two horizontal surfaces such as a curb, the wheelchair is positioned with the prominent hoop 34 overlying the vertical obstruction and the protected hoop positioned adjacent to the obstruction on the lower of the two horizontal surfaces. For this reason, the idling wheel 62 supporting the prominent hoop is positioned generally forwardly of the transverse centerline of the rolling support assembly. In order to effect this placement of the prominent hoop 34 relative to the vertical obstruction, and to be able to maintain a comfortable and safe seated posture with the seat articulation, it will ordinarily be desirable to move the rolling support rearwardly against the obstruction.

Figure 1B:
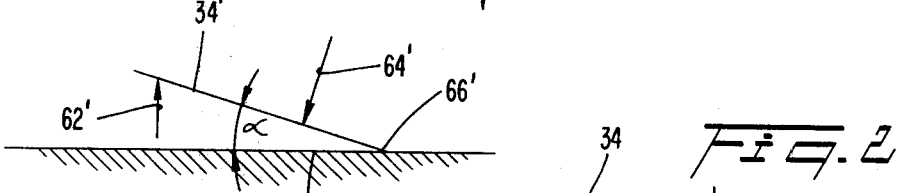
FIG. 1b is a schematic view of forces acting on a canted hoop.

At this point, the prominent hoop 34 presents what appears to be a very gradual incline up the vertical obstruction (see for example FIG. 1b). By rotating the chair 180°, or less depending on the height of the obstacle, the ground contact position of the prominent hoop moves to the upper vertical surface and the contact position for the protected vertical hoop is positioned remote from the vertical obstacle. The wheelchair is then advanced toward the obstacle so that the protected hoop rolls over the obstacle to place the protected hoop contact position on the upper horizontal surface. Accordingly, it will be apparent that the wheelchair provided in accordance with the present invention is capable of climbing a vertical obstacle without requiring the assistance of an attendant.

Figure 12:
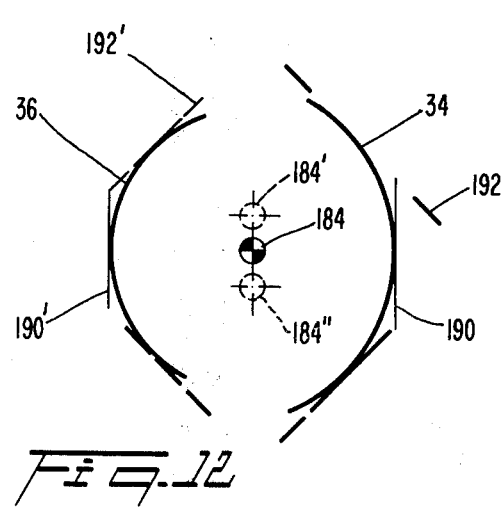
FIG. 12 is a schematic view of hoop tangents at the point of ground contact during forward and rearward excursions of the center of gravity.

The rolling geometry of this wheelchair has another inherent characteristic which is particularly desirable for disabled individuals: an inherent braking against inadvertent movement backward, as might occur when the occupant reclines when going up an inclined surface. In this connection reference is again made to FIG. 6. In the presence of an inclined surface, the center of gravity 156 is positioned rearward of the location illustrated in FIG. 6. Accordingly, because of the rolling geometry between the frame support system and the hoops, the seat portion 22 of the chair will assume a slightly reclined position in order to align the center of gravity 156 with the apparent radius of curvature 180. As this occurs, the ground contact tangents (see FIG. 12) for the hoops 34, 36 move from the positions 190, 190' where they are parallel to the positions 192, 192', respectively which are mutually antagonistic via friction to rolling. When descending an incline, a natural braking may be obtained by partially reclining the seat to move the center of gravity back of the balance point which makes the points of contact between the hoops and ground diverge. Controlled descent may be achieved by regulating the seat reclining action.

It will be seen that the tangents 192, 192' are convergent to one another. This convergence provides an inherent braking force which prevents the chair from rolling or sliding down the incline. The rolling geometry has a similar characteristic when the center of gravity 184 moves to the position 184" corresponding to a forward incline, which for forward motion becomes increasingly self rocking and dangerous. To compensate for this characteristic, the caster wheel assembly 194 (see FIG. 6) is provided at the forward end of the frame 38. During rolling of the wheelchair, the caster wheel is positioned as illustrated in FIG. 6 so as to engage the supporting surface and prevent the wheelchair center of gravity from moving forward of the position illustrated in FIG. 6. On the other hand, when it is desired to use the chair as a rocking chair, or to sit bolt upright at a desk or table, the caster wheel assembly 196 can be rotated about a horizontal axis to the stowed position where it will not interefere with rocking excursions or intentional forward tilting of the chair and center of gravity. The forward tilting with caster retracted is stable against forward or rearward rolling without formal braking. In the stowed configuration, the wheelchair occupant can thus rock in the same fashion that a non-disabled person does in a rocking chair and the inherent braking will keep the rocking chair from migrating even if the formal brake is not engaged.

To collapse the wheelchair for transportation or storage, the connecting rod 103 (see FIG. 7) is lifted from the pivot blocks 105, 105'. This movement allows the lever arms 30, 32 to pivot forwardly about the associated crank 90, 90' to a collapsed position. This collapsed position for the lever arms 30, 32 is also preferred when the wheelchair is to be used at a desk or table.

Further collapse of the chair requires folding of the seat assembly 22 (see FIG. 13). The seat bottom 142 is folded upwardly toward the seat back 140 until the bottom and back are closely adjacent. Simultaneously, the parallelogram linkages fold themselves and the leg support 144 against the seat bottom 140 (see FIG. 14). The head rest 166 then folds over the seat bottom 140 to retain the collapsed configuration for the seat. To collapse the seat 22 on the rolling suspension system 20, the support link 160 is disengaged from its supporting relation to the collapsible link 158. Thus, the seat assembly is allowed to fold down onto the rolling suspension system 20 in a longitudinally centered relationship to the rolling suspension system to the configuration shown in FIG. 15.

The wheelchair of this invention also makes possible a patient-oriented post-surgery recovery use. For example, the post-operative patient could be placed on a fully reclined wheelchair and returned to his room. As recovery progresses, the patient's movements would cause some rocking movement of the wheelchair. Such movements would jostle his internal organs in a therapeutic manner to discourage adhesion formation. Moreover, as recovery progressed, the patient would be able to move himself to actively discourage adhesion formation and to more comfortable positions as well as to move about the room itself.

SUMMARY OF THE MAJOR ADVANTAGES

A wheelchair constructed in accordance with the invention as described above has many advantages when compared with wheelchair structures currently available. As discussed above, the wheelchair has an inherent self-righting characteristic resulting from the very large effective radius of curvature for the rolling geometry.

A wheelchair embodying the present invention severely diminishes the potential of motion sickness for the wheelchair occupant: the occupant's head is positioned at the approximate center of rotation and is, therefore, isolated from the kinds of movement which generate motion-induced nausea. This allows the wheelchair to be used as a dynamic recovery aid and to force the occupant to move, use his muscles, and change the load-bearing zones.

A wheelchair in accordance with the present invention is also capable of climbing vertical obstacles without requiring assistance from an attendant. Moreover, vertical obstacles such as curbs can be quickly and efficiently traversed despite the nonexistence of easily negotiated ramps.

With the use of a differential gearing system, the propulsion assembly for this wheelchair is capable of traversing straight lines, gradual curves to either the right or the left, as well as sharp curves to either right or left. Because both hoops are always interconnected and powered, this wheelchair is capable of negotiating diagonal slopes and other conditions which are difficult or impossible with conventional wheelchairs. This combination always results in balanced two-wheel braking. Moreover, by changing the point of driving connection between the differential gearing and the crankshaft, the chair can be made to rotate about a vertical axis, as may be required in tight maneuvering situations.

The propulsion assembly is operated by a pair of lever arms which operate in a cambered elliptical path. This cambered elliptical path recognizes and utilizes the fact that the human arm is approximately three times stronger in push/pull movements than it is in up/down movements. Accordingly, by proportioning the major and minor axes of the cambered elliptical path in a ratio of approximately three to one, the relative strengths of the human anatomy are maximized in propelling the chair. There is no segment of the hand trajectory in which muscle action cannot provide active drive energy (no dwell). The forwardly inclined elliptical trajectory helps blood circulation in the arms, because the natural attitude for arms is downward hanging.

The mechanical advantage of the lever arms may be adjusted so as to increase or decrease the length of the cambered elliptical path associated with one revolution of the crankshaft. This adjustment translates, correspondingly, to increased or decreased traction and to decreased or increased speed. Accordingly, the wheelchair occupant can, himself, adjust the mechanism to different surface conditions so that approximately the same amount of effort is required despite the surface conditions. Likewise, if one arm is stronger than the other or the movement of one is impaired, but both are functional, the mechanical advantages on each side may be set differently to maximize overall efficiency.

The seat height of the seat assembly is selected to be comparable to the height of conventional chairs so that the wheelchair can be used conveniently and easily with existing furniture. The forward attitude for seating also locks the wheel hoops against unintentional rearward rolling of the chair.

In order to provide the disabled wheelchair user with a range of seating positions, parallelogram linkages enable the seat back, seat bottom and leg supports to be articulated relative to one another in positions ranging from the seat back being vertically upright to the seat back being fully reclined or to an intermediate position which may be suitable for television viewing. The head rest tilts forward for this purpose.

For those instances where it is desirable to adjust the vertical height or altitude of the seat bottom relative to the rolling support system, a vertical screw adjustment means is provided to change the position of the seat recliner cross members.

It should now be apparent that there has been provided in accordance with the present invention a novel vehicular suspension system and a novel wheelchair incorporating that suspension system. Moreover, it will be apparent to those skilled in the art that numerous modifications, variations, substitutions and equivalents exist for features of the invention which do not materially depart from the spirit and scope of the invention. Accordingly, it is expressly intended that all such modifications, variations, substitutions, and equivalents which fall within the spirit and scope of the invention as defined in the appended claims be embraced thereby.

What is claimed:

1. A vehicle suspension system comprising:
   frame means;
   a pair of ground engaging hoops, each hoop having a generally toroidal shape, defining a corresponding plane and being rotatable within that plane;
   hoop support means carried by the frame means for rotatably supporting each hoop so that its plane is inclined relative to a supporting surface and relative to the plane of the other hoop; and
   frame support means for supporting the frame means on each of the ground engaging hoops.

2. The system of claim 1 wherein the planes of the pair of hoops intersect to define an imaginary line parallel to and spaced above the supporting surface.

3. The system of claim 1 wherein:
   the hoop support means includes a pair of support members carried by the frame means, the support members being spaced apart and operable to elevate a portion of a corresponding ground engaging hoop.

4. The system of claim 3 wherein each support member is an idler wheel rotatably mounted on the frame means so as to rotate in response to rotation of the corresponding hoop.

5. The system of claim 4 wherein each idler wheel has a peripheral surface with a groove to receive the corresponding hoop.

6. The system of claim 1 wherein the frame support means is carried by the frame means and includes a stabilization means for orienting the frame means relative to the hoops.

7. The system of claim 6 wherein the stabilization means includes three wheels spaced about the frame means, two wheels engaging one of the pair of hoops and the third wheel engaging the other of the pair of hoops so as to define a generally triangular support for the frame means on the air of hoops.

8. The system of claim 6 wherein the stabilization means includes four wheels spaced about the frame means, two wheels being in engagement with one of the hoops and the other two wheels being in engagement with the other one of the hoops so as to define a quadrilateral support for the frame means on the pair of hoops.

9. The system of claim 8 wherein:
   all four wheels have the same diameter and engage the respective hoop at the same distance above the supporting surface so that peripheral speed of the wheels can be uniform; and
   locomotion means for driving the wheels is carried by the frame means so that the system is self-propellable.

10. The system of claim 1 wherein each hoop is tubular and filled by a sound dampening material so as to reduce acoustic vibrations.

11. The system of claim 1 wherein the first hoop of the pair has a larger diameter than the second hoop, the second hoop passing through the first hoop in the inclined configuration.

12. The system of claim 1 further including a locomotion means for driving the pair of hoops so as to propel the frame means along the supporting surface.

13. The system of claim 12 wherein the locomotion means includes a differential gear to allow the hoops to operate at different peripheral velocities during negotiation of a curved path.

14. A wheelchair for disabled persons comprising:
a seat; and
a rolling suspension means for supporting the seat, having round-engaging rolling supports with an apparent radius of curvature greater than the actual radius of curvature of the rolling supports, the elevation of the center of gravity for the combined seat and suspension means being below the elevation of the center of the apparent curvature so that the wheelchair is self-righting.

15. A wheelchair for disabled persons comprising:
a seat; and
a rolling suspension means for supporting the seat, having ground-engaging rolling supports with an apparent radius of curvature greater than the actual radius of curvature of the rolling supports, the elevation of the center of gravity for the combined seat and suspension means being below the elevation of the center of the apparent curvature so that the wheelchair is self-righting; and
wherein the rolling suspension means includes:
frame means;
a pair of ground-engaging hoops, each hoop defining a corresponding plane and rotatable within that plane;
hoop support means for rotatably supporting each hoop so that its plane is inclined relative to a supporting surface and relative to the plane of the other hoop; and
frame support means for supporting the frame means on each of the ground-engaging hoops.

16. The wheelchair of claim 15 wherein the planes of the pair of hoops intersect to define an imaginary line parallel to and spaced above the supporting surface.

17. The wheelchair of claim 15 wherein:
the hoop support means includes a pair of support members carried by the frame means, the support members being spaced apart and operable to elevate a portion of a corresponding ground-engaging hoop.

18. The wheelchair of claim 17 wherein each support member is an idler wheel rotatably mounted on the frame means so as to rotate in response to rotation of the corresponding hoop.

19. The wheelchair of claim 15 wherein the frame support means is carried by the frame means and includes a stabilization means for orienting the frame means relative to the hoops.

20. The wheelchair of claim 19 wherein the stabilization means includes three wheels spaced about the frame means, two wheels engaging one of the pair of hoops and the third wheel engaging the other of the pair of hoops so as to define a generally triangular support for the frame means on the pair of hoops.

21. The wheelchair of claim 19 wherein the stabilization means includes four wheels spaced about the frame means, two wheels being in engagement with one of the hoops and the other two wheels being in engagement with the other one of the hoops so as to define a quadrilateral support for the frame means on the pair of hoops.

22. The wheelchair of claim 15 wherein each hoop is tubular and filled by a sound dampening material so as to reduce acoustic vibrations.

23. The wheelchair of claim 22 wherein each hoop is provided with a resilient tire attached asymmetrically relative to the hoop plane so as to contact the supporting surface perpendicularly.

24. The wheelchair of claim 15 wherein the first hoop of the pair has a larger diameter than the second hoop, the second hoop passing through the first hoop in the inclined configuration.

25. The wheelchair of claim 15 further including a locomotion means for driving the pair of hoops so as to propel the frame means along the supporting surface.

26. The wheelchair of claim 25 wherein the locomotion means includes a differential gear to allow the hoops to operate at different peripheral velocities during negotiation of a turn.

* * * * *